J. H. BARR.

CYLINDER PRINTING PRESS.

APPLICATION FILED JULY 26, 1911.

Reissued Oct. 1, 1912.

13,469.

8 SHEETS—SHEET 1.

Witnesses:
James R. Mansfield.
L. E. Witham.

Inventor:
John H. Barr.
By:
Alexander Fowell
Attorney.

J. H. BARR.

CYLINDER PRINTING PRESS.

APPLICATION FILED JULY 26, 1911.

Reissued Oct. 1, 1912.

13,469.

8 SHEETS—SHEET 2.

Witnesses:
James R. Mansfield.
L. E. Witham.

Inventor:
John H. Barr.
By: Alexander Lowell
Attorneys.

J. H. BARR.

CYLINDER PRINTING PRESS.

APPLICATION FILED JULY 26, 1911.

Reissued Oct. 1, 1912.

13,469.

8 SHEETS—SHEET 3.

Witnesses:
James B. Mansfield
L. E. Witham.

Inventor:
John H. Barr
By: Wyndham Fowell
Attorneys

J. H. BARR.

CYLINDER PRINTING PRESS.

APPLICATION FILED JULY 26, 1911.

Reissued Oct. 1, 1912.

13,469.

8 SHEETS—SHEET 4.

Witnesses:
James B. Mansfield.
L. E. Witham.

Inventor:
John H. Barr.
By:
Alexander F. Lovell
Attorney

J. H. BARR.

CYLINDER PRINTING PRESS.

APPLICATION FILED JULY 26, 1911.

Reissued Oct. 1, 1912.

13,469.

3 SHEETS—SHEET 5.

Witnesses:
James R. Mansfield.
L. E. Witham.

Inventor:
John H. Barr.
By:
Alexander & Dowell
Attorneys.

J. H. BARR.

CYLINDER PRINTING PRESS.

APPLICATION FILED JULY 26, 1911.

Reissued Oct. 1, 1912.

13,469.

8 SHEETS—SHEET 6.

Witnesses:
James R. Mansfield.
L. E. Witham.

Inventor:
John H. Barr.
By:
Alexander F. Lowell
Attorney

J. H. BARR.
CYLINDER PRINTING PRESS.
APPLICATION FILED JULY 26, 1911.
Reissued Oct. 1, 1912.
13,469.
8 SHEETS—SHEET 7.
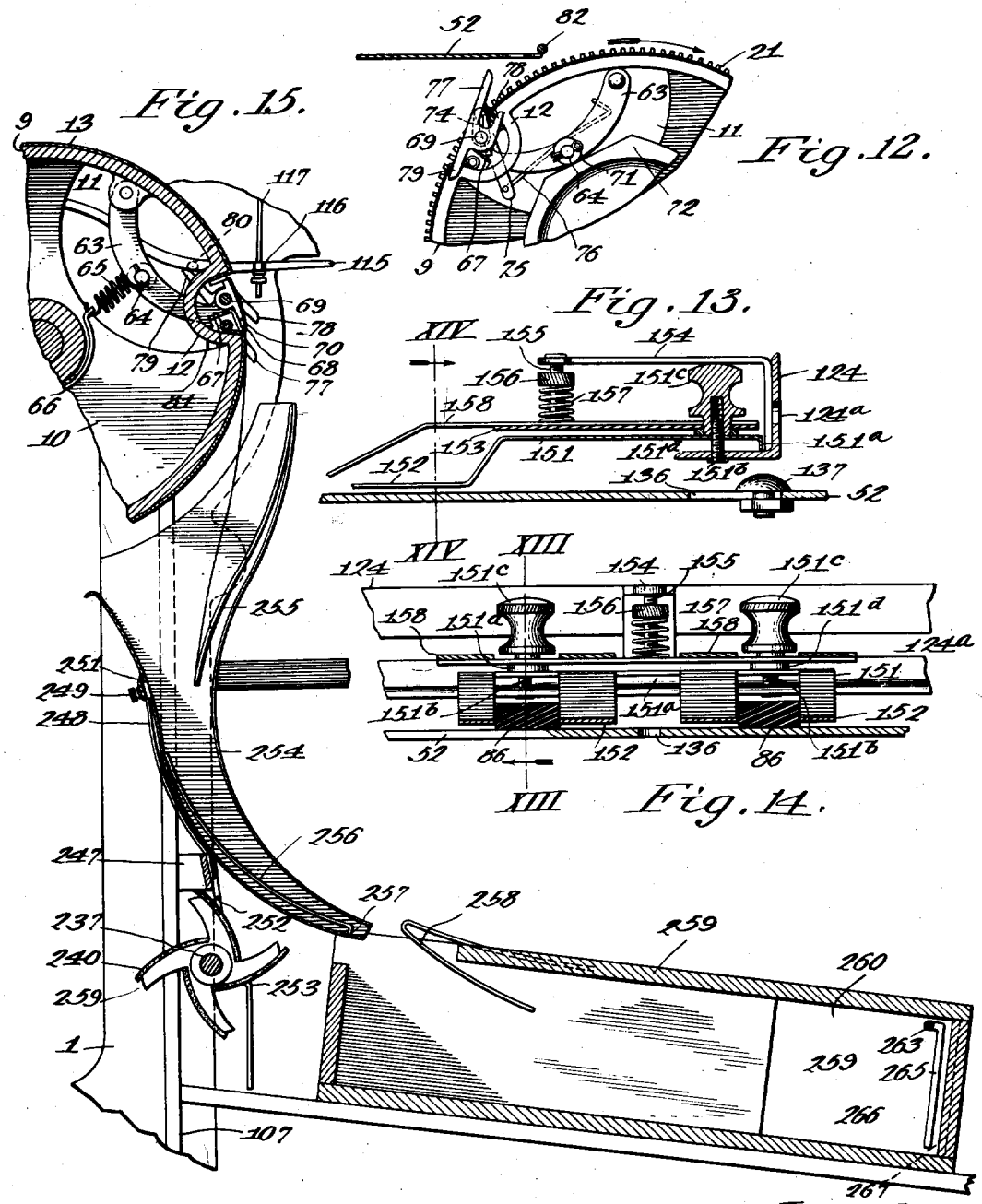
Witnesses:
James B. Mansfield.
L. E. Witham.
Inventor:
John H. Barr.
By:
Alexander Sprull
Att'y.

J. H. BARR.

CYLINDER PRINTING PRESS.

APPLICATION FILED JULY 26, 1911.

Reissued Oct. 1, 1912.

13,469.

8 SHEETS—SHEET 8.

Witnesses:
James T. Mansfield
L. E. Witham

Inventor:
John H. Barr.
By:
Alexander Fowell
Attorney

UNITED STATES PATENT OFFICE.

JOHN H. BARR, OF KANSAS CITY, MISSOURI.

CYLINDER PRINTING-PRESS.

13,469. Specification of Reissued Letters Patent. Reissued Oct. 1, 1912.

Original No. 956,751, dated May 3, 1910, Serial No. 448,246. Application for reissue filed July 26, 1911. Serial No. 640,703.

*To all whom it may concern:*

Be it known that I, JOHN H. BARR, a citizen of the United States, residing at Kansas City, in the county of Jackson and State of Missouri, have invented certain new and useful Improvements in Cylinder Printing-Presses, of which the following is a specification.

This invention relates to cylinder printing presses, and my object is to produce a machine of this character whereby stacked envelops or sheets of paper may be automatically and reliably conveyed one by one to the printing mechanism and there printed and after the printing operation be restacked evenly and smoothly.

With this general object in view, the invention consists in certain novel and peculiar features of construction and organization as hereinafter described and claimed; and in order that it may be fully understood reference is to be had to the accompanying drawings, in which:—

Figure 1:
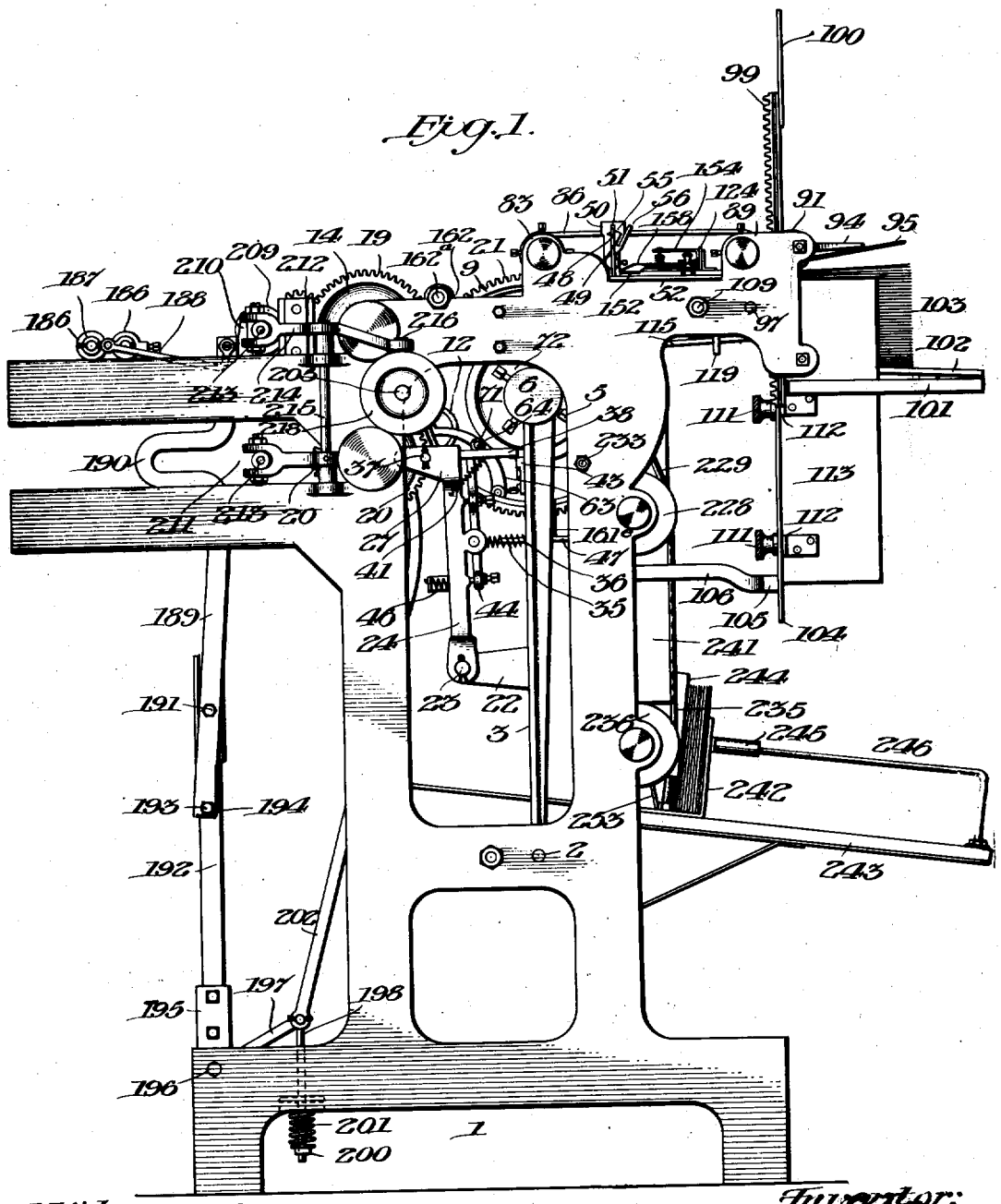
Figure 2:
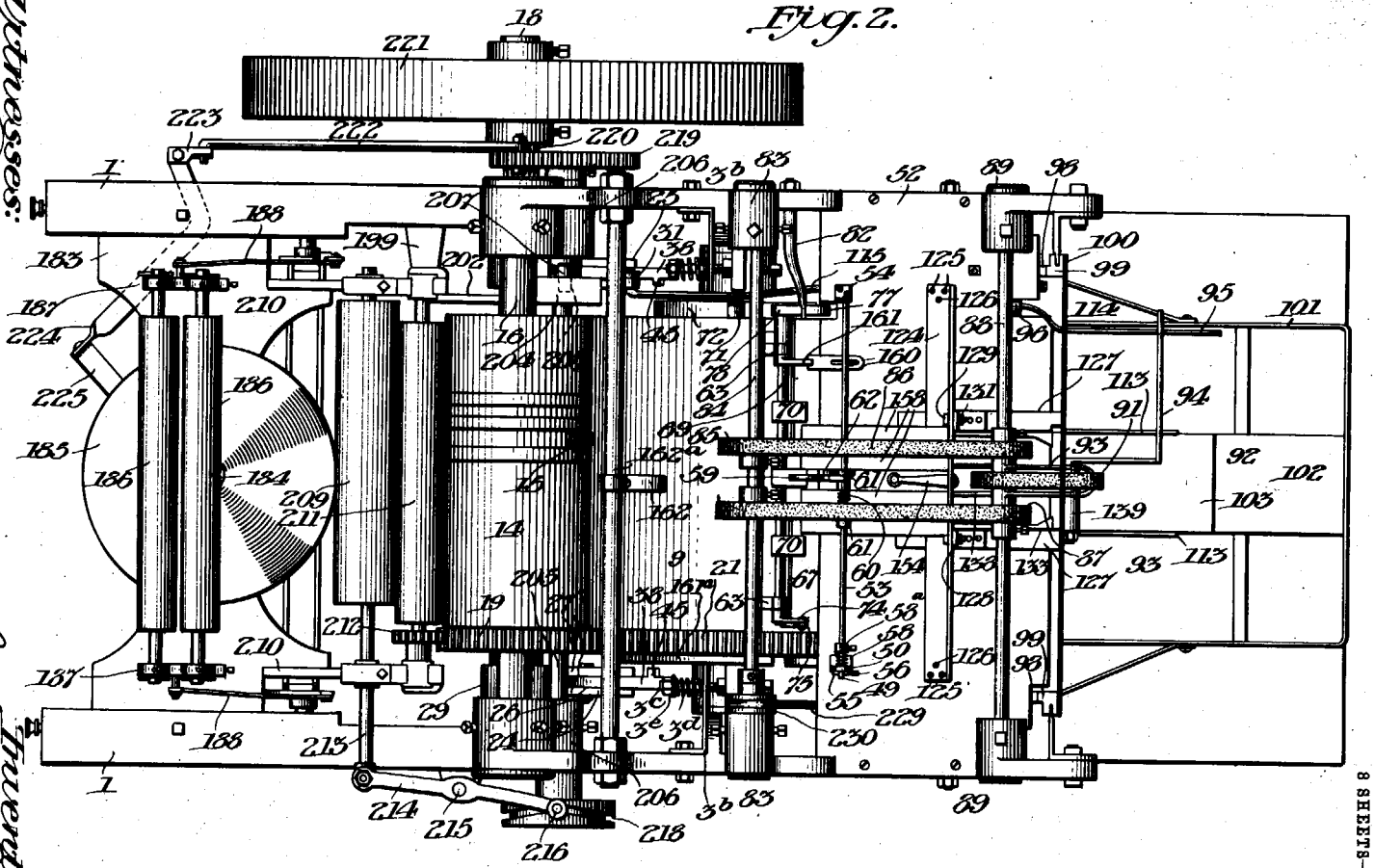
Figure 3:
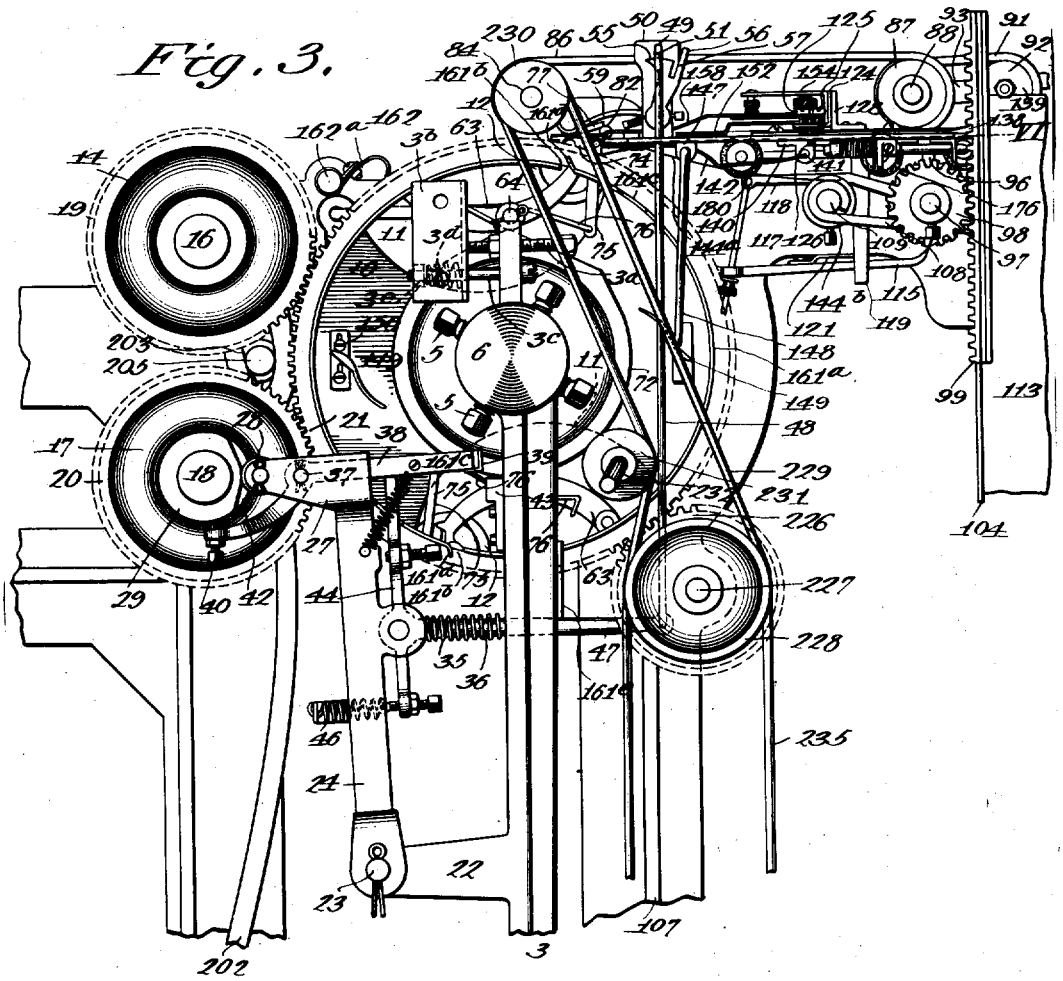
Figure 10:
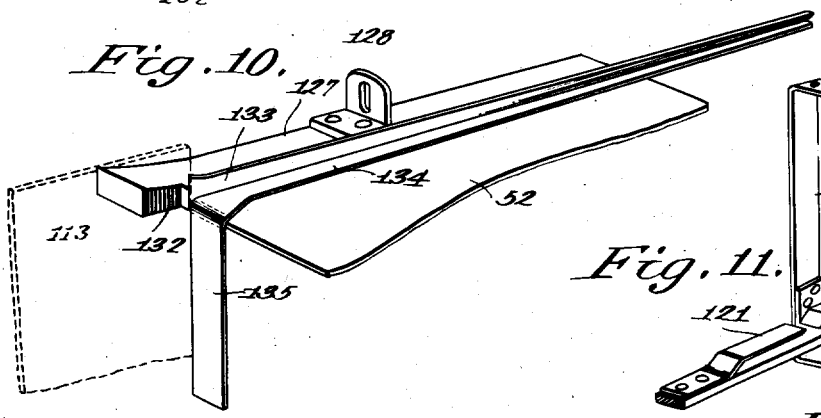
Figure 11:
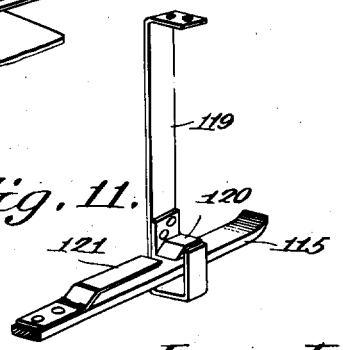
Figure 4:
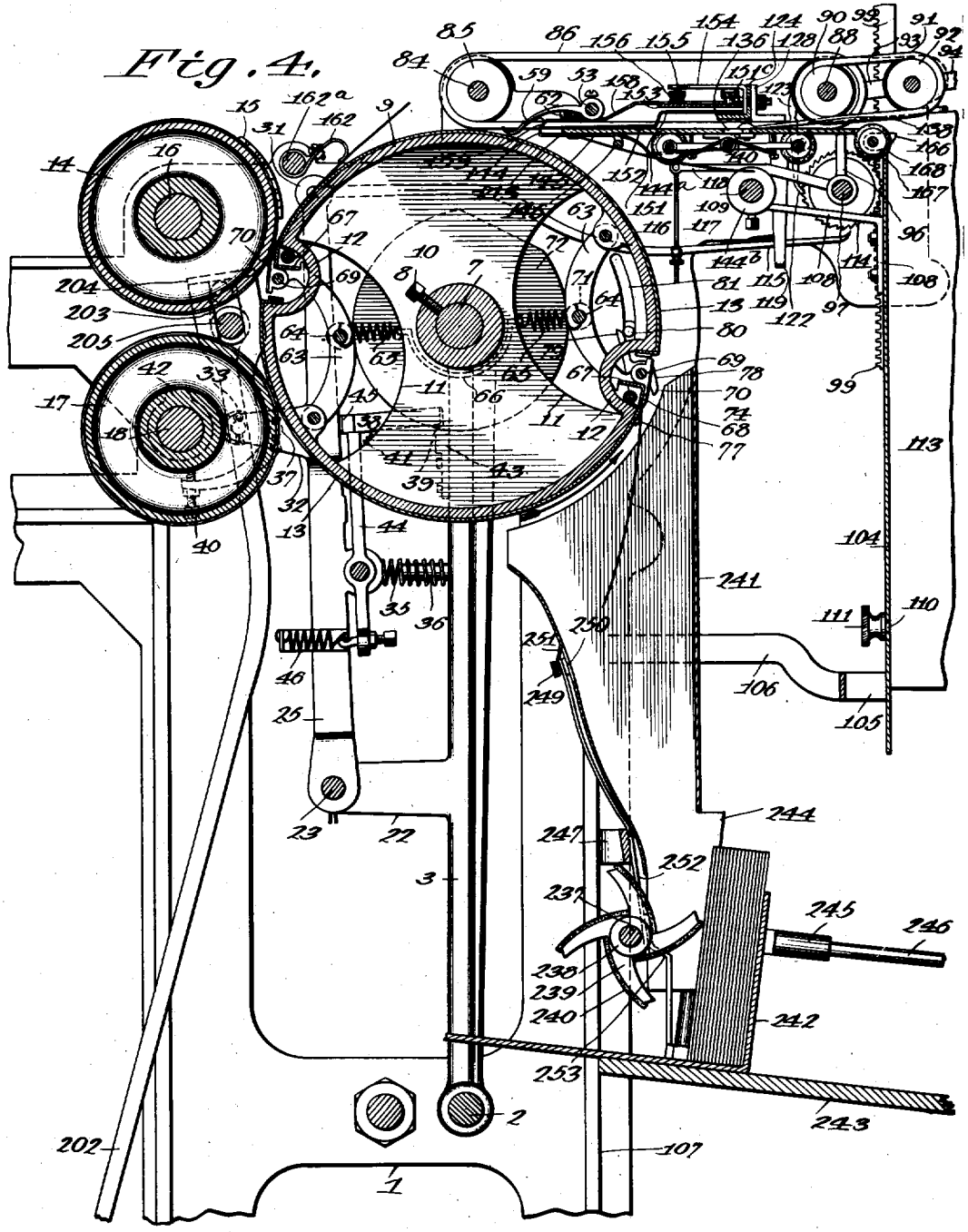
Figure 5:
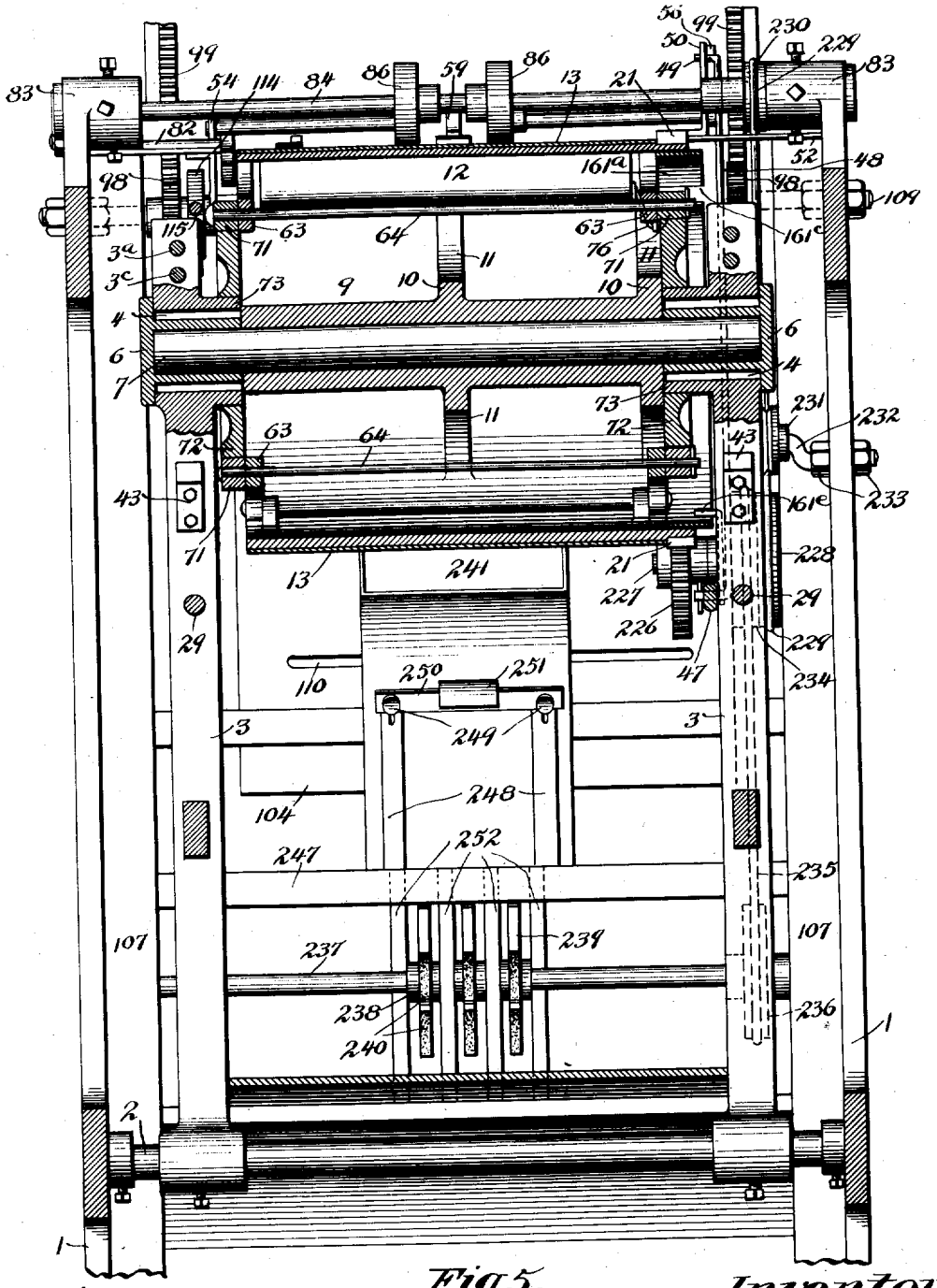
Figure 6:
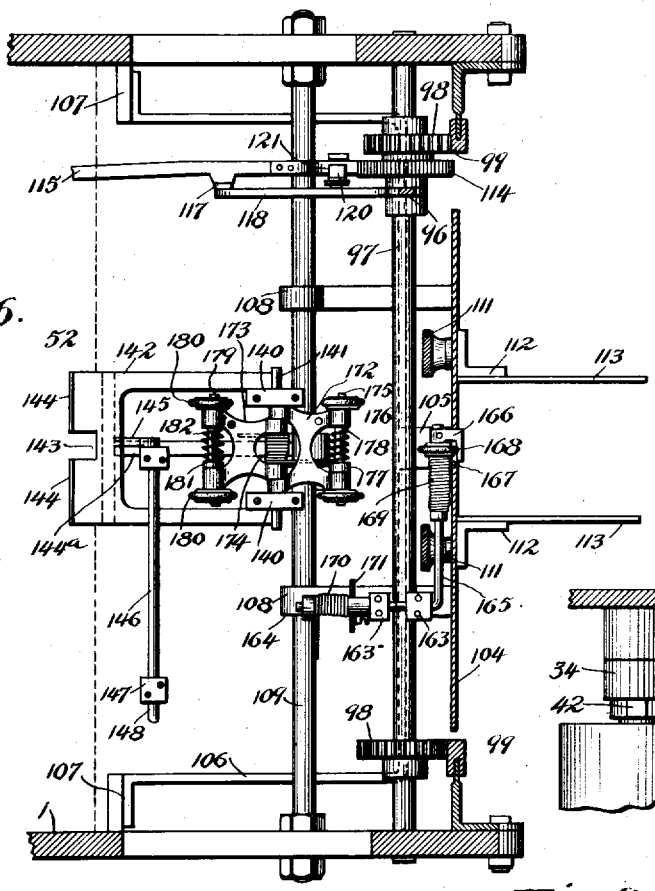
Figure 16:
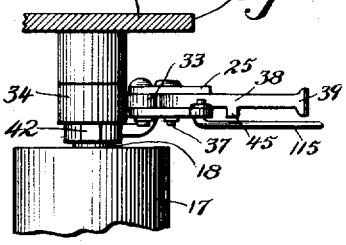
Figure 8:
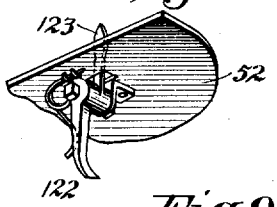
Figure 7:
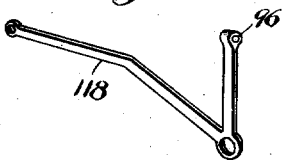
Figure 9:
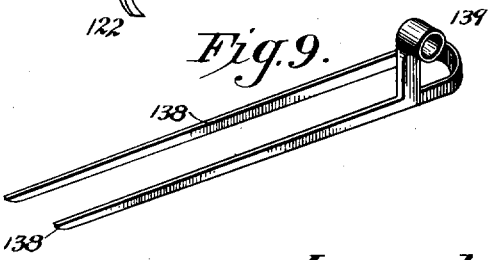
Figure 17:
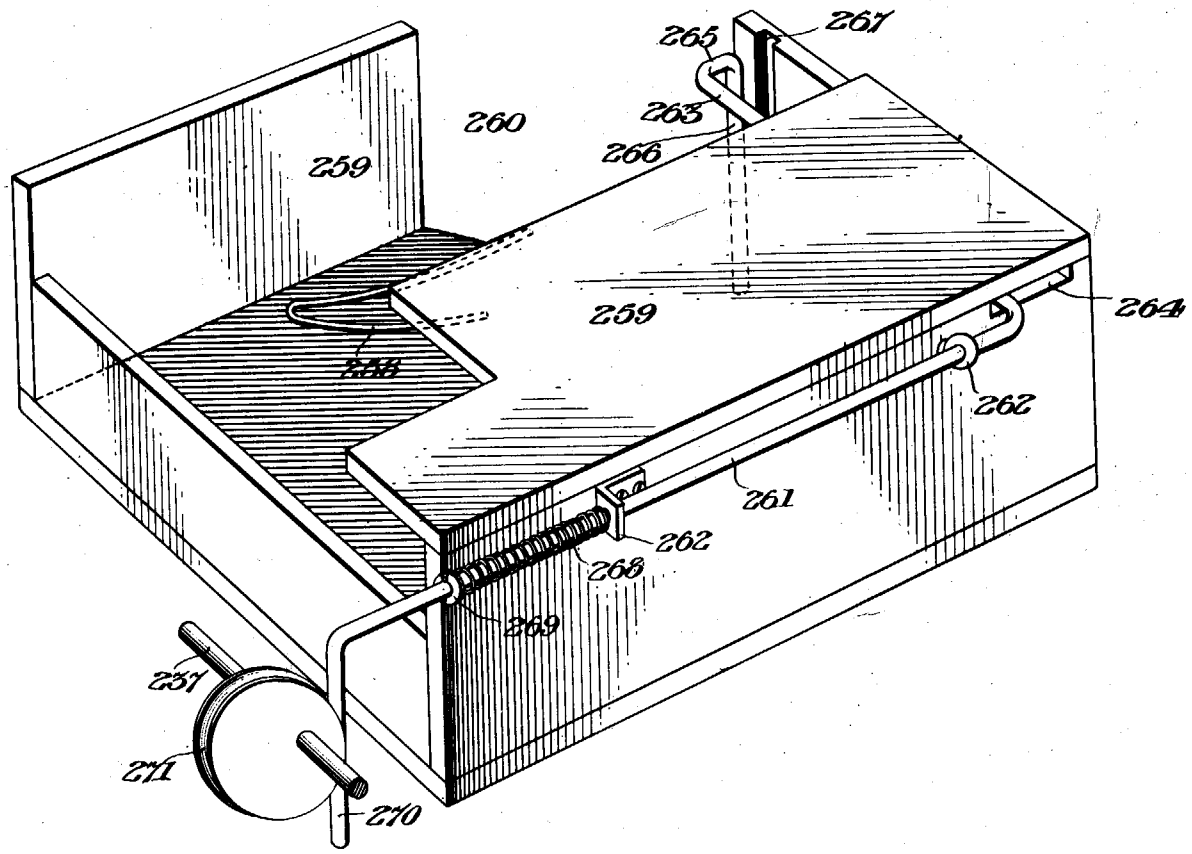

Figure 1, is a side view of a combined printing press and paper feed machine embodying my invention. Fig. 2, is a top plan view of the same. Fig. 3, is an enlarged side view of the major portion of the upper end of the press with the inner side of the frame omitted. Fig. 4, is a vertical longitudinal section on the line IV—IV of Fig. 2 and on the same scale as Fig. 3. Fig. 5, is a vertical section on the line V—V of Fig. 1 and on the same scale as Figs. 3 and 4. Fig. 6, is a horizontal section on the dotted line VI of Fig. 3. Figs. 7, 8, 9, 10 and 11 are detail perspective views of parts of the machine. Fig. 12 is a view of a part of the opposite end of the cylinder from that shown in Figs. 1 and 3, and also shows contiguous parts in section. Fig. 13, is an enlarged vertical longitudinal section on line XIII—XIII of Fig. 14, with the conveyer belt omitted. Fig. 14, is a section on the line XIV—XIV of Fig. 13. Fig. 15, is a vertical section of a part of the cylinder of the machine as equipped with a sheet-paper-chute and stacking receptacle, and Fig. 16 is a detail horizontal section to show chiefly, a pair of cams. Fig. 17, is a perspective view of the printed-sheet-receiving receptacle or box and the means for evenly stacking the sheets therein.

In the said drawings, 1 indicates the frame of the machine the same being of the type shown or of any other suitable or preferred construction.

2 is a transverse rock shaft journaled in the lower part of the frame and 3 is a pair of rock-arms mounted on and near the ends of shaft 2, and provided at their upper ends with set screws $3^a$ to strike against brackets $3^b$ secured to the frame and thereby limit the rearward movement of said arms and to return them to their original positions, bolts $3^c$ are secured to them and extend slidably through said brackets $3^b$, and are equipped with springs $3^d$, bearing against the brackets and nuts $3^e$ on the front ends of said bolts $3^c$. Near their upper ends arms 3 are provided with circular openings 4, into which project set screws 5 for centering in said openings the cylindrical journal-caps 6 receiving the ends of a transverse shaft 7, and secured by set screws 8 or otherwise on shaft 7, is a cylinder 9 equipped with partitions 10 provided at diametrically opposite points with large openings 11 to accommodate parts hereinafter described, the peripheral portion of the cylinder at diametrically opposite points being divided into two similar sections by inwardly projecting segment-shaped portions 12, which portions provide between said sections external troughs or cavities extending longitudinally of the cylinder, and each section is equipped peripherally if desired, with a thin smooth covering or tympan 13.

14 is a roller paralleling and adjacent to the cylinder and adapted to be equipped with a printing plate 15 and mounted rigidly on a shaft 16 journaled in the frame. A similar roller 17 is also arranged parallel with and adjacent to the cylinder and is mounted on a similar shaft 18 journaled in the frame and equipped with a belt-wheel hereinafter referred to, to be driven by a belt, not shown. Rollers 14 and 17 are equipped at one end with gear wheels 19 and 20 respectively which mesh with the gear wheel 21 of the cylinder, the length of the teeth of said gears being such that the cylinder may move bodily toward and from said rollers without throwing its gear-wheels out of mesh with the gear-wheels of said rollers.

22 are lugs projecting from the rock arms 3, connected by the cross-rod 23 upon which is pivoted a pair of rock-arms 24 and 25 disposed at opposite ends of the cylinder.

The upper end of arm 24 is bifurcated at 26 and the branch-arms formed by said bifurcation have lugs 27 projecting toward shaft 18, and journaled between said lugs is an anti-friction roller 28 engaging a cam 29 secured on shaft 18. Arm 25 is also bifurcated at 30, one of the branch-arms formed by such bifurcation being prolonged upward at 31, and projecting from the said branch-arms of arm 25 are lugs 32 corresponding exactly to lugs 27, and carrying between them an anti-friction roller 33 to engage a cam 34 secured on shaft 18 at the opposite end of printing roller 17, cam 34 being an exact duplicate in form and arrangement of cam 29. These cams are adapted once in each revolution, by engagement with said anti-friction rollers, to cause swing arms 24 and 25 to swing toward their carrying-arms 3, springs 35 interposed between arms 24 and 25 and arms 3 and mounted on pins 36 projecting from the last-named arms, resisting such movement and returning arms 24 and 25 to their original positions immediately after rollers 28 and 33 pass the crests or points of said cams.

Pivoted on pins 37 carried by lugs 27 and 32, are levers 38 extending through bifurcations 26 and 30 of arms 24 and 25 respectively, toward arms 3, and equipped at their ends adjacent to the last-named arms with wear-plates 39, and at their opposite ends with set-screws 40 held by retractile springs 41 into peripheral engagement with cams 42 secured on shaft 18 between cams 29 and 34 and the printing roller 17, the points or crests of cams 42 being adapted once in each revolution, against the resistance of springs 41, by engagement with set-screws 40 to rock levers 38 and raise their wear-plate ends above the plane of the lugs 43 of arms 3, for a purpose which hereinafter appears.

44 are levers pivoted to arms 24 and 25 in the vertical plane of lugs 45 projecting inward from levers 38, springs 46 connecting the lower ends of said levers with projections of arms 24 and 25, tending to hold the upper ends of levers 44 between the planes of lugs 45 and arms 3. One of the levers 44 is provided with an arm 47 pivotally connected to the lower end of rod 48 terminating at its upper end in a hook 49 projecting into the vertical slot 51 of a bracket 50 mounted upon a horizontal plate 52 secured to the frame, rearward of the cylinder.

53 is a horizontal shaft journaled in bracket 50 and a bracket 54 also secured to plate 52, and provided at the outer side of bracket 50 with a crank-arm 55 to engage the underside of hook 49, said crank-arm having an upwardly projecting stop 56 for engagement at times with the hook, and a notch 57 contiguous to the stop to receive the hook at certain times, as hereinafter explained.

58 is a coil spring mounted on shaft 53 and bearing against bracket 50 at one end and at the other against a collar 58[a] secured on shaft 53 for the purpose of holding yieldingly-depressed an arm 59 also journaled on said shaft on the plane of the longitudinal center of the machine, a stiffer spring 60 being also mounted on said shaft and secured at its opposite ends to arm 59 and a collar 61, mounted on the shaft, to hold arm 59 pressed yieldingly downward upon the underlying angle-arm 62 of collar 61 rigidly secured to shaft 53. Under certain conditions hereinafter named, spring 60 will yield and permit arm 59 to swing upwardly independently of the shaft and its connections, it being understood in this connection and by reference to Fig. 4 particularly, that the free end of arm 59 depends below the plate 52 and lies close to the periphery of the cylinder normally.

Referring now to the gripping mechanism which is in duplicate for the purpose of gripping and carrying two envelops or sheets of paper around the cylinder with each revolution thereof: 63 indicates a pair of inwardly-bowed swing-arms pivoted to and within the cylinder and connected by a rod 64, the two rods of the duplicate sets of arms 63 being connected by retractile springs 65, to a semi-circular link 66, the link being of such form to avoid the shaft 7. The free ends of each pair of arms 63 project outwardly into one of the troughs of the cylinder, the ends of the trough being recessed for such purpose, and within said trough is equipped with a longitudinally extending bar 67 provided at suitable points with jaws 68. Parallel with bar 67 and journaled in the free ends of swing-arms 63 is a rock-shaft 69 provided with jaws 70 disposed opposite and adapted to clamp against the jaws 68, or an envelop or sheet of paper which may be interposed therebetween, this clamping action occurring at the moment the anti-friction rollers 71 carried by and at the outer sides of the bowed arms 63, attain the crests or points of stationary cams 72 supported at opposite ends of the cylinder upon the inwardly projecting hub portions 73 of swing-arms 3. Secured upon one end of each rock shaft 69 is a crank-arm 74, projecting in the same general direction as the jaws 70 and connected by a link 75 to one end of the spring 76 coiled on rod 64 and having its opposite end engaging the adjacent bowed arm 63, the tendency of said spring being to exert a pressure on the rock-shaft tending to hold its jaws clamped against the jaws 68 or an envelop or sheet of paper therebetween. At times the jaws 70 of the rock-shaft are swung back by means hereinafter described, from jaws 68 against the resistance of spring 76, and after the central point in such opening movement of the jaws 70 has been passed, the spring 76 tends to continue such movement and hold the said jaws in such position until reclosed by means hereinafter described.

Secured on the opposite end of each rock-shaft 69 from the crank arm 74, is a bifurcated rock-arm which projects in the same general direction as jaws 70, the branch 77 of each bifurcated rock-arm being of greater length than the companion branch 78, and projecting from the said rock-arm at the opposite side of the shaft is a hook 79 which is disposed inwardly of the shaft and forwardly of the same with respect to the direction of rotation of the cylinder, preliminary to the opening movement of the jaws 70, it being understood that the cylinder rotates in the direction indicated by the arrow, Fig. 4. In such rotation the hook engages a stationary pin 80 projecting inwardly from the contiguous side of the frame, said frame being provided with a slot 81 to permit of such adjustment of said pin as to accommodate envelops or sheets of paper of varying lengths. As the hook 79 of each rock-shaft 69 engages said pin, which, as will be understood by reference to Fig. 4, is nearer the axis of the cylinder than the rock shaft, it first overcomes the resistance of springs 65 and causes the connected arms 63 to swing outward slightly. The resistance of the stronger spring 76 is then overcome and as a result the rock-shaft 69 is turned about a half a revolution and thus widely opens or distends the two sets of clamping jaws, the retractile tendency of spring 76 accelerating the latter half of such opening movement. Immediately after the rock-shaft is thus turned a half revolution with the result described, the jaws of said shaft emerge from under the front end of the plate 52 and at the same time the outermost end of the longer branch 77 of the bifurcated arm just previously turned by pin 80, comes into engagement with a second rigid pin 82 projecting inwardly from the adjacent side of the frame, which pin is disposed a distance from the center of the cylinder slightly greater than the rock shaft and as a result reverses the operation of the latter until it has again passed the center, when the spring 76 completes such reverse operation and causes the jaws of the rock-shaft to snap toward the jaws of the cross-bar as the latter emerges from under plate 52, this clamping action of the jaws as hereinbefore stated occurring as the rollers 71 ride over the crests of the cams 72. Immediately after the jaws are reclosed said rollers ride down upon the cams and permit springs 65 to again swing arms 63 inwardly to substantially the position shown in Fig. 4.

Journaled in bosses 83 cast with the sides of the frame, is a shaft 84 equipped with a pair of pulleys 85 connecetd by belts 86, with a pair of pulleys 87 mounted on a similar shaft 88 journaled in similar bosses 89 on the frame, these belts being so arranged as to frictionally engage an envelop or sheet of paper lying upon plate 52 and move it forwardly thereon until arrested by certain devices hereinafter described.

90 is a belt wheel mounted on the shaft 88, between pulleys 87 and connected by a belt 91 with a pulley 92 suitably journaled in a yoke 93 pivoted on shaft 88, said yoke being equipped with an angle-arm 94 resting and supported on an arm 95 projecting rearwardly from the upper end of a crank-arm 96 journaled on a shaft 97 journaled in the sides of the frame, and provided near each end with gear pinions 98 engaging vertical rack-bars 99 connected at their upper ends by an arch 100 and at their lower ends by a horizontal frame 101 equipped with a removable bed-plate 102 adapted to carry a stack of envelops or sheets of paper to be printed, a stack of the former being shown and indicated at 103.

104 indicates a vertical plate arranged in the plane of the rack-bars, against which the envelops or sheets of paper to be printed are stacked, as hereinafter more particularly referred to, the lower end of said plate being secured to a lug or extension 105 of a substantially U-shaped frame 106 secured to vertical ribs 107 of frame 1. The plate 104 terminates below the plane of belt 91 and is equipped near its upper end and at opposite sides of its vertical center with a pair of brackets 108 secured at their opposite ends to a tie-rod 109 connecting the sides of the frame 1. Plate 104 is provided with horizontal slots 110 through which adjustable clamping-screws 111 extend into brackets 112 rigid with a pair of vertical guide plates 113, these plates 113 being adapted to be brought in such relation as to admit snugly between them the stack of envelops 103 or a stack of letter paper, not shown, it being understood that where sheets are to be printed a larger bed, not shown, but corresponding in other respects to bed 102 will be employed.

For the purpose of automatically elevating the envelop or sheet of paper feed-bed to accommodate the diminishing size of the stack as the envelops or sheets of paper are moved successively forward therefrom by the belt 91, and thus facilitate the delivery of such envelops or sheets in rapid succession to the printing mechanism, shaft 97 is equipped with a ratchet-wheel 114 adapted to be intermittently operated by the pawl 115 pivoted to the prolongation 31 of arm 25, and reciprocated by the rocking action hereinbefore mentioned, of said arm 25.

The pawl 115 has a lug 116 to which is adjustably secured a link 117 pivoted at its upper end to a rock-arm 118 rigid with the upwardly projecting rock-arm 96 hereinbefore described, the arrangement being such that when the belt 91 is resting on the top of the stack 103, the arm 94 is above and out of contact with arm 95 projecting from arm 96. As a result the weight of the yoke 93 which as hereinbefore described is pivoted on shaft 88, is not imposed on arm 95, and the pawl is permitted to gravitate wholly below ratchet-wheel 114 and consequently does not affect such ratchet. As the belt 91 successively removes the topmost envelop or sheet of paper from the stack, it is gradually depressed by the gravitative action of the pivoted yoke and thus imposes the weight on shaft 88, is not imposed on arm 95, and depresses the same. This depression through the connections described, raises the free end of the pawl and causes the same on its next rearward movement, to engage and turn the ratchet-wheel 114 and, through pinions 98 and rack bar 99, raise the frame 101 and the stack of envelops or sheets of paper carried thereby, and to prevent lateral swinging movement of the pawl, it extends through the hook-shaped lower end of a guide 119, depending from plate 52. To further insure the elevation of the stack in response to a very slight downward movement of the yoke and feed-belt 91, the guide 119 is provided with a wedge-arm 120 disposed toward the cylinder, and an arm 121 is secured on pawl 115, the said arm 121 in the inoperative reciprocation of the pawl playing back and forth under wedge 120. When the pawl is raised however, as explained, even if the elevation does not bring arm 121 clear above the wedge, the former will strike and ride upwardly on the wedge which thus insures a sufficient elevation of the pawl to cause it to engage and operate the ratchet-wheel and hence perform the function explained. For the purpose of holding the envelop or paper-carrying frame in the position to which it is adjusted by the pawl-and ratchet-mechanism, as hereinbefore explained, a spring-actuated pawl 122 is pivotally supported from and below plate 52, and engages the ratchet-wheel 114, said pawl 122 being provided with a handle 123 projecting up through an opening in plate 52 to enable the person in control to trip pawl 122 from engagement with the ratchet, to permit the envelop or paper-carrying frame to descend to its initial position to receive a new charge of envelops or sheets of paper.

124 indicates an angle-bar extending transversely of plate 52 and equipped at each end with a pair of adjusting screws 125 resting upon said plate, and near said screws and occupying a plane between them are screws 126 which extend down through said plate, the arrangement being such that by screwing the front pair of screws 125 downward and the rear pair upward or vice versa, the bar can be tilted downwardly and rearwardly or downwardly and forwardly, respectively, for a purpose which hereinafter appears, the angle-bar tilting on screws 126 as the fulcrum for such movements.

127 indicates a pair of bars arranged longitudinally of and resting on plate 52 and provided with vertically-slotted angle-brackets 128 bearing against the rear side of angle-bar 124. Bolts 129 extend through the longitudinal slot 124[a] of angle bar 124 and also through the slots of angle-brackets 128, and are engaged by clamping nuts 131 for the purpose of clamping said angle-bar and hence the bars 127 the proper distance apart to accommodate envelops and sheets of paper of varying widths, the vertical slots of the brackets being to permit bar 124 to be tilted as explained without affecting the position of bars 127. The bars 127 project beyond the rear edge of plate 52 and have notches 132 in the inner sides of said projecting ends to snugly receive the front edges of guide 113, as shown most clearly in Fig. 10. Bars 127 are formed in the vertical planes of plates 113 with upwardly projecting guide walls 133 which toward their front ends, are preferably inclined inwardly to restrain the sheets of paper or envelops adapted to successively travel forward between them, from buckling or bending upward at their edges, and said bars are also provided with horizontal flanges 134 projecting inwardly from the lower margins of walls 133 and lying flatly on plate 52. The front ends of said flanges 134 terminate in arms 135 which fit against the front edge of plate 52 and depend below the same for the purpose of preventing the forwardly disposed edges of the stacked envelops or sheets of paper from catching on the front edge of the plate 52 instead of passing freely upward above the same.

Secured adjustably in the longitudinal slot 136 in plate 52 centrally between conveyer belts 86 and below transverse angle bar 124 which bridges the lower strands of said belts, is a round-headed bolt 137, the head of said bolt being disposed at the upper side of plate 52 and in the path of each envelop or sheet of paper so as to compel the same to buckle upward slightly in the plane of its longitudinal center, for a purpose which hereinafter appears, and to sharply define this buckling action I provide a pivoted U-shaped guide 138, having a sleeve portion 139, pivoted to one end of the shaft of belt wheel 92, and arranged with its arms at opposite sides of the lower strand of belt 91 and converging downwardly and forwardly toward and resting at their free ends on plate 52 at opposite sides of the upward projection of said plate constituted by the head of bolt 137.

Secured to and depending from plate 52 at opposite sides of the plane of bolt 137, is a pair of bearings 140, (Figs. 3, 4 and 6,) for a transverse shaft 141 forming a support outward of said bearings for a plate 142, projecting beyond the front edge of plate 52 and terminating at its free end at opposite sides of a notch 143 therein, in upwardly projecting flanges 144 of sufficient length to normally project above the plane of plate 52 under the pressure of a spring 144[a] secured to a collar 144[b] on the rod 109, and resting upon said plate 142 is the crank 145 of a transverse rock-shaft 146, journaled in bearings 147 secured to and depending from plate 52, the said rock-shaft at its opposite or outer end, being equipped with a downwardly-projecting crank-arm 148 to be engaged and rocked backward twice in each revolution of the cylinder 9, by a pair of cam-lugs 149 secured to the cylinder, as shown at 150.

151 is a plate (see Figs. 13 and 14) overlying the lower arm of angle-bar 124 and formed with a depending flange 151[a] resting on said lower arm and with a series of fingers 152, converging with respect to plate 52 and projecting beyond the front end of the same to about the plane of the inner sides of flanges 144 of the plate 142, it being noted in this connection that the fingers 152 are disposed at such a slight angle with respect to plate 52, that they will hold an envelop or sheet of paper flatly down upon said plate and thus guard against the former buckling or doubling under the frictional pressure imposed upon it by the forwardly moving lower strands of belts 86. The finger-equipped plate 151 is fitted upon a pair of upwardly projecting stud-bolts 151[b] and engaging said stud-bolts and resting upon said plate 151 are nuts 151[c], said nuts being utilized to vary the pressure of the front ends of the fingers upon the front end of plate 52. Said nuts also extend through a plate 153 overlying plate 151, washers 151[d] fitting on said nuts between said plates 151 and 153, the last-named plate being prevented, by said stud-bolts extending through them, from moving laterally or longitudinally though it is capable of a slight vertical play.

154 is an angle bracket secured to angle bar 124 centrally of the latter and depending from the front end of bracket 154 is a stud-bolt 155 provided with a nut 156 and with an expansion spring 157 bearing at its upper and lower ends against said nut 156 and plate 153, said plate being equipped with forwardly projecting fingers 158 overlying fingers 152 and terminating at their front ends in downturned ends 159 normally engaging the upper ends of flanges 144 of the plate 142, hereinafter termed the detainer. Fingers 152 and 158 are also hereinafter termed the lower and upper retainers.

160 indicates an adjustable wedge mounted on plate 52 and projecting beyond the front edge of the same and adapted to be engaged by the crank arm 161, Fig. 1, of gripper shaft 69 to prevent the movable gripper jaws from clamping the envelop or sheet of paper down upon the stationary gripper jaws until its front end has reached detainer flanges 144 and thus insure that all of the envelops or sheets of paper shall receive impression from the printing plate at corresponding distances from their front edges, it being further noted in this connection that the upper retainers 158 are designed to hold the envelops or sheets of paper against movement by belts 86 in the event that the detainer 142 is depressed before the envelop or paper has reached its flanges 144.

161[a] is a circular flange projecting from the cylinder and provided at diametrically opposite points with notches 161[b] and at other diametrically opposite points with notches 161[c], and 161[d] are lips projecting outwardly and forwardly from the rear edges of notches 161[b], with respect to the direction of rotation of the cylinder.

161[e] is an angle-arm projecting from arm 47 and normally engaging the inner side of the circular flange, the parts being so arranged that one of the notches 161[c] shall pass arm 161[e] before the rear end of an envelop or sheet of paper is drawn forwardly, as hereinafter explained, off the plate 52.

As a gripping mechanism emerges from below the plate 52, one of the jaws 70 of its rock-shaft as the latter is being turned to perform its clamping function, engages and presses arm 59 upward out of the path of the envelop or sheet of paper and then with the companion jaws clamps said envelop or sheet down upon the companion jaws 68 of the bar 67, and draws such envelop or sheet forward, the retainers yielding upward slightly under such movement of the envelop or sheet. The upward movement of arm 59 causes rock-shaft 53 to turn because spring 60 is of greater strength than spring 58, the turning of the shaft of course throwing arm 55 rearwardly under hook 49, at this time held elevated against the resistance of springs 46, by the flange 161[a] underlying angle arm 161[e] of arm 47. It will thus be seen that, as the envelop or sheet of paper is being drawn forward, it will sustain the comparatively light pressure of spring 58, because the flange 161[a] upholds hook 49 through the engagement of hook 161[e] with the underlying flange 161[a], the pressure of spring 58 being so light that the arm makes no crease or mark on the supporting envelop or sheet. In the rotation of the cylinder hook 161$^{e}$ can not pass downward through the notch 161$^{b}$ which first passes it because at such time the arm 55 sustains the downward pressure of hook 49 induced by springs 46, and thus relieves the envelop or sheet of such duty. As the continued rotation of the cylinder disposes one of the notches 161$^{c}$ below the hook 161$^{e}$, the latter cannot pass down through such notch because the underlying envelop or sheet upholds arm 59 and consequently holds arm 55 under the hook 49 as hereinbefore explained. The proportion and arrangement of the parts is such that one of the notches 161$^{c}$ passes under and beyond hook 161$^{e}$ before the rear end of the envelop or sheet being conveyed forward by the gripping mechanism, clears the front end of plate 52 so that after such envelop or sheet does clear the front end of said plate and thus permits spring 58 to effect the depression of arm 59 and the forward movement of arm 55 until the stop 56 strikes the side of the hook, the said flange 161$^{a}$ retains the hook in its elevated position over slot 57 against the resistance of springs 46, which of course tend to pull said hook downward. By thus maintaining the hook elevated which is the case as long as envelops or sheets are taken in regular order from plate 52 to the cylinder the levers 44 are maintained under lugs 45 of levers 38 and the latter are maintained with their rear ends above lugs 43, in which position they are free to be reciprocated by the cams 29 and 34 without moving arms 3 and consequently without affecting the position of the cylinder. When no sheet of paper or envelop is passing through the machine or in the event that an envelop or sheet fails to reach the detainer flanges at the proper time, the arm 59 after being raised by the gripping mechanism, as hereinbefore explained, drops immediately back to its original position and thus disposes notch 57 under hook 49 so that as the cylinder rotates and before the printing plates attain operative positions with relation thereto, the springs 46 will cause angle arm 161$^{e}$ to drop down through the first notch 161$^{c}$ encountered, it being noted in this connection that the notch 161$^{b}$ which passes arm 161$^{e}$ before the said notch 161$^{c}$ attains a position below said arm, is so narrow that arm 161$^{e}$ has no time to drop through it. As the arm 161$^{e}$ drops through the notch 161$^{c}$, the hook 49 descends into notch 57 provided to accommodate such movement of the hook, and at the same time levers 44 are swung rearwardly from under lugs 45 of levers 38 to permit the springs 41 of the latter to rock their rear ends downward into the horizontal plane of lugs 43. As a result the next rearward movement imparted to levers 38 by cams 29 and 34, is transmitted to swing arms 3 for the purpose of swinging the cylinder bodily rearward a sufficient distance to prevent contact between it and the printing plates, it being noted in this connection that such movement is so slight that the gear wheel 21 remains in mesh with the gear wheels 19 and 20 to avoid any interruption in the rotative movement of the cylinder. The cams 42 effect the reëlevation of levers 38 immediately the rear end of the envelop or sheet of paper passes the printing plate of roller 14 but said levers are immediately redepressed at their rear ends because levers 44 are held out of the plane of movement of lugs 45 through the continued depression of angle-arm 161$^{e}$ by that portion of flange 161$^{a}$ between the notch 161$^{c}$ through which said arm dropped and the notch 161$^{b}$ at the opposite of the cylinder. Because of this arrangement the printing plates rotate out of operative relation with the cylinder before the latter is swung back toward the printing roller which action occurs by the engagement of the lip 161$^{d}$ of the notch 161$^{b}$ last referred to, engaging the inwardly projecting portion of the angle arm 161$^{e}$, and raising the same through said opening to the inner side of the flange, the hook 49 being incidentally raised above the plane of the notch 57 and the levers 44 being restored to their original positions below lugs 45 of levers 38. It will thus be seen that it is impossible for the cylinder to become defaced through contact with the printing plates.

It will be observed by reference particularly to Fig. 3, that when a gripper mechanism is passing the front end of plate 52, the lip 161$^{d}$ at the opposite side of the cylinder has still some distance to travel before it reaches the vertical plane of arm 161$^{e}$ and that at such time the cams 24 and 39 are about ready to start levers 30 on the rearward part of their reciprocatory movement. Assuming that the said gripper mechanism fails to pick up the envelop or sheet on plate 52 but that the other gripper mechanism is carrying its envelop or sheet, it will be seen that the depression of arm 69 immediately following its elevation by the first-named gripper mechanism, is not followed by the drop of the hook 49 into notch 57 because flange 161$^{a}$ will not permit arm 161$^{e}$ to drop until it is reached by opening 161$^{c}$ by which time the tail-end of the envelop or sheet carried by the other gripper mechanism has passed the printing plate of roller 17 and received the impression of said plate. It will thus be seen that the circular flange is utilized to hold levers 44 under lugs 45 as long as possible to prevent the throw-off of the cylinder until the said envelop or sheet of paper has passed the second printing plate and that without utilizing said flange as described, or some other mechanism for accomplishing the same purpose, the throw-off would occur before the said sheet or envelop had received the impression from the second printing plate, which in practice is designed for printing with ink of a different color from that used in connection with the printing plate of roller 14. After the depression of arm 69 occurs and the throw off action has also occurred, it will be understood that hook 49 is occupying the lower part of notch 57 and is locked in such position because flange 161[a] is holding arm 161[e] depressed. With the parts as thus arranged, it will be seen that the next time arm 59 is raised by the gripper mechanism, spring 60 must yield because the shaft 53 is locked through the engagement of hook 49 with notch 57, and as soon as said gripper mechanism releases said arm 59, it will be depressed by said spring 60, which is employed simply to permit arm 59 to be raised by the grippers when the machine is running empty and therefore when arm 163 is held depressed for the greater part of the time by flange 161[a].

To guard against the rear end of the envelop or sheet of paper as it is drawn forward from under belts 86 by the gripping mechanism from swinging forward and thus possibly becoming defaced by the printing plate of roller 14, a guard 162 is secured to the transverse tie-bar 162[a], connecting the sides of the frame between roller 14 and the cylinder.

To guard against any possibility of the feeding mechanism becoming choked by the entrance into the feed-way of a number of envelops or sheets of paper simultaneously, I provide the following construction:—163 indicates a pair of plates secured to and depending from plate 52 and forming a journal for the shaft 164 extending parallel with the feed belts and at one side of the same, and provided at its rear end with a transversely extending crank-arm 165 equipped with an angular separating device 166 projecting through an opening 167 in plate 104, the rear arm of said separating device extending transversely of said opening 167 and being of substantially right-angle triangular form with its hypotenuse face pitched upwardly and rearwardly for the purpose of compelling each envelop or sheet of paper as it passes such device to slide rearwardly slightly in order to attain a position at the upper side of the said arm. Journaled on the crank arm 165 of shaft 164 is a rubber faced or equivalent faced feed-roller 168 disposed in the longitudinal center of plate 52, and projecting upwardly through the same and forwardly through opening 167 of plate 104 and held by a torsion spring 169 mounted on arm 165, against the hub-portion of said separating device against free rotation, said spring permitting said roller to turn when a single envelop or sheet of paper is clamped between it and the overlying feed belt 91, but offering a resistance in the event that two envelops or sheets of paper get between said roller and the feed belt, greater than or in excess of the friction between the said two envelops or sheets of paper in order to arrest or retard the lower one and thus permit the upper one to be carried rapidly forward by the belt. A torsion spring 170 is mounted on rock-shaft 64 with one arm bearing against the overlying plate 52 and the other arm secured to a notched arm 171 secured on the shaft, the arrangement being such that said spring 170 tends to raise upward crank-arm 165 and hold the retarding feed-roller against the belt 91 or any envelop or sheet of paper interposed between the roller and said belt.

Rearward of roller 168 is a second feed-retarding mechanism, the same being constructed as follows:—172 and 173 are plates hinged to shaft 141 and projecting rearwardly and forwardly therefrom respectively, and held pressed yieldingly upward at their free ends by means of a torsion spring 174 mounted on shaft 141 and having each of its ends underlying one of said hinged plates. Journaled in the free end of plate 172 is a transverse shaft 175 equipped at each end with a rubber faced or equivalent faced roller 176 pressed upwardly through plate 52, against feed belts 86 except when an envelop or sheet of paper is interposed between them. Shaft 175 is equipped with a rigid collar 157 and with a spring 178 bearing at one end against the plate 172 and at the other pressing said collar against said plate in order to guard against free rotation of said rollers. 179 indicates a transverse shaft journaled in the free end of plate 173 and equipped at its end in line with rollers 176 with rubber-faced or equivalent faced rollers 180. The said shaft is also provided with a rigid collar 181 and with a spring 182 bearing at one end against the plate 173 and at its opposite end against collar 181 to hold the same also against said plate and thus prevent free rotation of rollers 180, it being understood that the latter, like rollers 176, are pressed yieldingly upward by spring 174 through plate 52 and against belts 86 when an envelop or sheet of paper is not interposed between them.

For the purpose of supplying ink to the printing plates, the following construction is provided:—183 is a cross bar carried by the upper portion of the frame and journaled centrally therein is a vertical shaft 184, equipped with a pair of circular ink-distributing plates 185, above and below bar 183, the upper one only appearing, and extending transversely across each plate 185 is a pair of ink-distributing rolls 186, journaled in bearing-frames 187 connected pivotally by links 188 with the upper end of a pair of arms 189, provided with forwardly bent goose-neck portions 190 for a purpose which hereinafter appears. Arms 189 are pivoted at 191 to upright arms 192, clamping-bolts 193 extending through arms 189 and slots 194 in arms 192, to permit of a slight pivotal adjustment of said arms 189. The arms 192 are secured to the upwardly projecting crank arms 195 of a rock-shaft 196 journaled in the lower portion of the frame and provided also with a rearwardly projecting rock-arm 197 from which the rod 198 extends downward through a bracket 199 projecting from said frame (see full lines Fig. 2 and dotted lines Fig. 1). A nut 200 is secured on the lower end of said rod and an expansive spring 201 is mounted on said rod and bears at its upper and lower ends against said bracket 199 and nut 200 to hold the rock-arm 197 yieldingly depressed. 202 is a bar pivotally connected to the rear end of the rock-arm 197 and provided with a slot 203 and equipped with a laterally projecting top-plate 204. A shaft 205, is journaled in bearings 206 of the frame and is equipped with a crank arm 207, carrying a roller 208, underlying and adapted once in each revolution of the shaft to engage plate 204, and raise bar 202 against the resistance of spring 201, for the purpose of rocking shaft 196 and thereby causing rolls 186 to roll across plates 185 to distribute the ink thereon, one of each set of said rolls 186 thus engaging and supplying ink uniformly to a roll 209 journaled in suitable bearings carried by rearwardly projecting arms 210 secured to or cast with cross bar 183. The rolls 209 in turn transfer ink to rolls 211 also suitably journaled in bearings carried by arms 210 and adapted to supply ink to the printing plates of printing rolls 14 and 17, the rollers 211 being equipped with gear-wheels 212 meshing respectively with gear wheels 19 and 20 of printing rollers 14 and 17. To effect a thorough and uniform distribution of the ink on rolls 211, the shafts 213 of rolls 209 are capable of reciprocatory action in their bearings and at one end are prolonged and pivotally connected to rock-levers 214 secured on a vertical shaft 215 carried by the frame, the opposite ends of said rock-levers having pins 216 engaging the cam-grooved collar 218 mounted on shaft 205. Mounted on the opposite end of shaft 205 is a gear wheel 219 meshing with and adapted to be driven by gear teeth 220 of shaft 18, equipped with belt wheel 221 hereinbefore referred to. Pivotally connected to a wrist pin or gear wheel 219, is a link 222, pivoted at its opposite end for movement in a vertical plane, to the link 223 pivoted for movement in a horizontal plane to a floating link 224 rigidly secured to a lever 225 journaled on shaft 184 and equipped with a spring-actuated pawl, not shown, engaging a ratchet wheel, not shown, on said shaft, in order that the rocking movement imparted to lever 225 may impart an intermittent rotary movement to the inking plates 185, for a more thorough and equable distribution of ink deposited upon said plate by inking mechanism, not shown, because of any suitable or preferred type.

226 is a gear-wheel meshing with gear-wheel 21 of the cylinder 9 and journaled on a stub-shaft 227 secured to the contiguous side of the frame. 228 is a grooved belt-wheel rotatable with said gear wheel 226 and connected by a belt 229 with a belt-pulley 230 secured on shaft 84. 231 is a grooved guide-pulley engaging said belt between wheels 228 and 230 to tension it, said guide and tension pulley being journaled on the cranked inner end of a stud-bolt 232 secured by clamping nuts 233 to the contiguous side of the frame, the connections described transmitting movement from the cylinder to the feed-belts 86 and hence to feed-belts 91.

234 is a grooved belt-wheel rotatable with belt-wheel 228 and connected by a belt 235 to a similar belt-wheel 236 of a transverse shaft 237 journaled in the frame, said shaft being equipped with a plurality of rotary kickers, consisting of small hubs 238 provided with outwardly projecting and preferably slightly curved arms 239 having their operative or convex faces covered by rubber or equivalent strips 240, to avoid injury to the envelops as the latter after being printed, are stacked, as hereinafter explained.

241 indicates a guide-chute arranged vertically below the rear portion of the cylinder and tapering downward and terminating in the vertical plane of the kicker arms when the latter are projecting rearwardly, the front wall of the chute being pitched downwardly and rearwardly, by preference, to impart the taper to the chute, the side walls being disposed apart a distance exceeding the width of the envelops, it being further noted that the upper edges of the side walls extend substantially concentrically of the cylinder and with the rear wall, terminate in a plane a little below the axis of the cylinder, so that when hook 79 of one of the gripper mechanisms engages and is operated by pin 80 to move the movable clamping jaws 70 from engagement with the jaws 68 of bar 67, the printed envelop will be released by said jaws shortly after its lower or free end passes over the front wall of the chute and enters the latter, which envelop drops down through the chute and is directed by the same into the path of movement of the kicker arms, which force it outward until and after it drops upon the bottom of the angular receptacle 242 resting upon the downwardly and rearwardly inclined support 243 carried by the frame, the upwardly projecting arm of said receptacle forming a backing for the envelops to maintain them in an upright position as they are successively stacked by the kickers, it being further noted in this connection that to guard against lateral movement of the envelops until they are stacked, the side walls of the chute are prolonged downward as at 244 below the plane of the kicker-shaft and are also extended rearward to a plane beyond that described by the outer ends of the kicker arms in order that the last two or three envelops stacked shall be between said side-extensions 244, after the kicker arms have passed out of engagement with them. The kicker arms as the stack of envelops in receptacle 242 is rapidly enlarged, exerts a direct rearward pressure upon it to cause said receptacle to slide directly rearward upon its support 243, and in order to guard against twisting movement of said receptacle a sleeve 245 is secured to the upright portion of the receptacle and disposed outward of one side of the same and fits slidingly on the inverted U-shaped guide rod 246 carried by the support 243.

247 is a cross bar connecting flanges 107 of the frame above the kickers, and secured to said bar is a pair of upwardly projecting bars 248 having pin and slot connections 249 with the cross bar 250 in order that the latter may be vertically adjusted slightly to permit the downwardly disposed hook 251 of the front wall of the chute to be easily slipped over the bar and be supported thereby, the latter being then adjusted vertically through the pin and slot connections to raise the chute until it is almost in contact with the cylinder.

252 indicates a series of bars secured to and extending downward from bar 247 rearward of the kicker-shaft 237 and between the kickers thereof to guard against any possibility of the envelops being carried around and forwardly under the kicker-shaft by the kicker arms, said arms in approximately the horizontal plane of said shaft, being bent to form downwardly and rearwardly extending shoulders 253, to positively deflect the lower edges of the envelops rearwardly off said arms and toward the upwardly projecting backing arm of the receptacle.

Referring now to Fig. 15, which shows a printed sheet receiving receptacle and a chute to deliver such sheets thereto after released from the cylinder in the same manner as described with regard to the delivery of the printed envelops; 254 indicates the chute adapted to be suitably supported in substantially the same position and by the same means as the envelop chute, which of course is removed to accommodate the sheet-paper chute, the latter tapering toward its lower or delivery end and also curving rearwardly so as to cause the paper to travel mainly in a horizontal direction as distinguished from the substantially vertical movement of the envelops, and in order to guard against adhesion and possible buckling of each sheet of paper in the chute 254, the latter is provided centrally with a spring rod 255 attached at its upper end to the upper end of the rear wall of the chute and extending downwardly in the latter and divergently with respect to said rear wall to about the plane which the lower edge of the sheet will occupy as it is released from the cylinder, the forward swing imparted to the sheet by the movement of the cylinder and by its own resiliency as it swings past and over the upper edge of the front wall of the chute causing it as it strikes said spring to bend or buckle forward over the latter, this bending or buckling stiffening it so that as released by the cylinder, it will travel vertically downward without any tendency to adhere to the rear wall of the chute as might occur if it was brought flatly against the same. As it drops down into the chute it straightens out and as it strikes the rod 256 secured centrally in the chute to the lower portion of the front wall thereof, it bends or creases in the opposite direction or reversely, so that it cannot engage for its full width and possibly adhere to the underlying portion of the front wall, this reverse bend or crease imparted to it by said rod 256 causing it to emerge from the lower end of the chute and travel in a substantially straight line and not bend or float upward as soon as it emerges as would be the case if not so creased or buckled. Immediately after it emerges it strikes the downwardly and rearwardly sloping guide rod 258 secured to one edge of the top of the receptacle or box 259, the upper portion of said box or receptacle beyond said edge of its top being open so that in conjunction with the opening 260 formed at the adjacent rear corner of the box, the sheets may be more readily grasped and removed therefrom, it being understood that they will be stacked one upon the other. To stack the sheets evenly I provide the following construction:—261 is a rod mounted in guides 262 carried by the completely closed side wall of the box. 263 is a horizontal arm projecting from the rear end of said rod into the box through a slot 264 in said side wall. At its opposite end the arm is bent rearwardly at 265 and downwardly to form the depending arm 266 to move back and forth endwise of the box into and out of a vertical groove 267 in the rear end wall and thus be constantly tapping against the rear edges of the stack of sheets of paper therein to compel said edges to lie flush with each other. A spring 268 is mounted on rod 261 and bears at its opposite ends against one of the guides 262 and the collar 269 on the rod for the purpose of holding the depending arm 266 normally forward of the rear wall of the box, and in order to force said rod and consequently said arm rearwardly at suitable intervals said rod is provided with a depending arm 270 in the path of a rotary cam wheel 271 mounted on the kicker-shaft, said cam wheel being grooved to receive said arm 270 and assist in preventing rotative movement of the reciprocatory rod.

In general the operation of the machine is as follows:—The stack of envelops or sheets of paper as the case may be, upon the vertically movable bed is carried upward thereby through the action of mechanism described, until engaged by the superposed feed-belt 91, the envelops or sheets before coming into engagement with the feed-belt being forced by the separating device 166 rearwardly a sufficient distance to break the adhesive tendency which two envelops or sheets naturally have after being pressed flatly together. As the topmost one is carried forward by belt 91, it frictionally engages roller 168 and is compelled by fork arms 138 and belts 86 to pass under angle bar 124, the guide walls 133 tending to maintain the envelop or sheet of paper against lateral or twisting movement. As each envelop or sheet is conveyed past the projection of plate 52, it is bent or buckled upward at its center as hereinbefore explained, the said projection being so disposed that when the front bend of such envelop or sheet has reached detainer flanges 144, its rear end is still overlying and buckled or arched by said projection so as to occupy so much of the path that the following envelop or sheet will strike such buckled or arched rear end and be thereby prevented from overlapping the buckled envelop or sheet, it being understood that the friction rollers 176 and 180 coöperate with the belts in effecting the feed of the envelops or sheets. In the event that two envelops or sheets of paper get between the belts and one or two of said rollers at the same time, the latter act as retarders, that is to say, they cease to rotate because they offer a greater resistance to the progress of the envelop or sheet engaging them than such envelop or sheet of paper offers to the superposed envelop or sheet engaged frictionally by the belt 91 or belts 86. It will thus be seen that at four points in the progress of the envelops or sheets there are provided means for guarding against the passage to the cylinder of more than one envelop or sheet at a time, said means being the separating device 166, the roller 168, and the rollers 175 and 180, and in addition to the devices enumerated the plate is provided with the projection hereinbefore described, for causing the envelop in engagement with the retainer flanges 144, to offer an obstruction to the further advance of the following envelop or sheet. Should two or more envelops, from any cause, succeed in reaching the front end of plate 52 and be engaged at such end and drawn forward by one of the gripping mechanisms the spring 60 will yield sufficiently to permit arm 59 to swing upward slightly to accommodate the passage below it of two or more envelops or sheets simultaneously without injury thereto. It will be understood the parts are so timed and proportioned with respect to each other, that when one envelop or sheet is being printed the preceding one is delivered into the chute by the operation of the gripping mechanism by pin 80, such pin as hereinbefore explained effecting the opening of the gripping jaws, the second pin 82 reclosing said jaws upon the envelop or sheet of paper on plate 52, at about the same instant that the detainer is depressed, as hereinbefore explained. After the envelops or sheets of paper are dropped into chute 241 or 254, respectively they are stacked as hereinbefore described.

From the above description it will be apparent that I have produced a printing press possessing the features of advantage enumerated as desirable and I wish it to be understood that I do not desire to be restricted to the exact details of construction shown and described as obvious modifications will suggest themselves to one skilled in the art.

It will be seen that the impression cylinder is provided with two impression surfaces 13, and constitutes with the form cylinder 14 a printing couple. If a sheet is improperly fed to one of the impression surfaces the impression cylinder will be thrown off impression or out of contact with the form cylinder at the time that the sheet should have been printed had it been properly fed, and the impression cylinder would be automatically thrown on impression or returned to its printing position in time to present the sheet fed to the other impression surface to the form cylinder. If no sheet should be fed to the other impression surface, however, the impression cylinder would again be thrown off impression or out of printing position.

Having thus described the invention what I claim as new and desire to secure by Letters Patent, is:—

1. In a printing press, a printing-plate-carrying roller suitably driven, an impression cylinder held yieldingly toward said plate and geared to said roller, a gripper mechanism carried by the cylinder and consisting of jaws bearing a hinged relation, an envelop or paper-sheet-supporting plate contiguous to the cylinder, means to open said jaws as the cylinder revolves, means to project the gripper mechanism beyond the periphery of the plate as it passes the latter, and means to close said jaws as such passage is made and cause them to pick up the sheet of paper or envelop and draw it from said plate.

2. In a printing press, a printing-plate-carrying roller, suitably driven, an impression cylinder held yieldingly toward said plate and geared to said roller, a gripper mechanism carried by the cylinder and consisting of jaws bearing a hinged relation, an envelop or paper-sheet supporting plate contiguous to the cylinder, means to open said jaws as the cylinder revolves, means to project the gripper mechanism beyond the periphery of the plate as it passes the latter, an arm intercepting the path of forward movement of a sheet of paper or envelop upon said plate, and means as the gripper mechanism passes said plate to close the jaws and cause them in such closing movement to first move said intercepting arm out of the path of said envelop or sheet of paper and then close upon and draw the latter forwardly off the plate.

3. In a printing press, a printing-plate-carrying roller suitably driven, an impression cylinder held yieldingly toward said plate and geared to said roller, a gripper mechanism carried by the cylinder and consisting of jaws bearing a hinged relation, an envelop or sheet of paper supporting plate contiguous to the cylinder, means to open said jaws as the cylinder revolves, means to project the gripper mechanism beyond the periphery of the plate as it passes the latter, an arm intercepting the path of forward movement of a sheet of paper or envelop upon said plate, means as the gripper mechanism passes said plate to close the jaws and cause them in such closing movement to first move said intercepting arm out of the path of said envelop or sheet of paper and then close upon and draw the latter forwardly off the plate, and means to return said arm to its original position after the envelop or sheet of paper has been wholly withdrawn from the plate.

4. In a printing press, a printing-plate-carrying roller suitably driven, an impression cylinder held yieldingly toward said plate and geared to said roller, a gripper mechanism carried by the cylinder and consisting of jaws bearing a hinged relation, an envelop or sheet of paper supporting plate contiguous to the cylinder, means to open said jaws as the cylinder revolves, means to project the gripper mechanism beyond the periphery of the plate as it passes the latter, an arm intercepting the path of forward movement of a sheet of paper or envelop upon said plate, means as the gripper mechanism passes said plate to close the jaws and cause them in such closing movement to first move said intercepting arm out of the path of said envelop or sheet of paper and then close upon and draw the latter forwardly off the plate, means to return said arm to its original position after the envelop or sheet of paper has been wholly withdrawn from the plate, and means whereby the cylinder is moved away from but not out of gear with said roller after the envelop or sheet of paper has received its impression from said printing plate.

5. In a cylinder printing press, the combination of a printing roller, a cylinder geared to said roller, yielding means holding the cylinder in the plane of movement of the printing surface of the roller, oscillatory arms supporting the cylinder, rock-arms pivotally carried by said cylinder-supporting arms and held with their free ends pressed yieldingly therefrom, levers pivotally carried by said rock-arms, means holding said levers inoperative with respect to the cylinder-supporting arms, means rotatable with the said roller for imparting endwise movement to said levers toward the cylinder-supporting arms, means to trip the means holding said levers in said inoperative position, means to throw said levers to operative position after said holding means is tripped, and means to swing said rock-arms toward the cylinder-supporting arms to cause said levers to swing the cylinder-supporting arms and withdraw the cylinder from the plane of movement of the printing surface of said roller without throwing said roller and cylinder out of gear.

6. In a cylinder printing press, the combination of a printing roller, a cylinder geared to said roller, yielding means holding the cylinder in the plane of movement of the printing surface of the roller, oscillatory arms supporting the cylinder, rock-arms pivotally carried by said cylinder-supporting arms and held with their free ends pressed yieldingly therefrom, levers pivotally carried by said rock-arms, means holding said levers inoperative with respect to the cylinder-supporting arms, means rotatable with the said roller for imparting endwise movement to said levers toward the cylinder-supporting arms, means to trip the means holding said levers in said inoperative position, means to throw said levers to operative position after said holding means is tripped, means to swing said rock-arms toward the cylinder-supporting arms to cause said levers to swing the cylinder-supporting arms and withdraw the cylinder from the plane of movement of the printing surface of said roller without throwing said roller and cylinder out of gear, and means for restoring said levers to inoperative relation with respect to the cylinder-supporting arms.

7. In a cylinder printing press, the combination of a printing roller, a cylinder geared to said roller, yielding means holding the cylinder in the plane of movement of the printing surface of the roller, oscillatory arms supporting the cylinder, rock-arms pivotally carried by said cylinder-supporting arms and held with their free ends pressed yieldingly therefrom, levers pivotally carried by said rock-arms, means holding said levers inoperative with respect to the cylinder-supporting arms, means rotatable with the said roller for imparting endwise movement to said levers toward the cylinder-supporting arms, means to trip the means holding said levers in said inoperative position, means to throw said levers to operative position after said holding means is tripped, means to swing said rock-arms toward the cylinder-supporting arms to cause said levers to swing the cylinder-supporting arms and withdraw the cylinder from the plane of movement of the printing surface of said roller without throwing said roller and cylinder out of gear, and cams rotatable with said roller for restoring said levers to inoperative relation with respect to the cylinder-supporting arms.

8. In a cylinder printing press, the combination of a printing roller, a cylinder geared to said roller, yielding means holding the cylinder in the plane of movement of the printing surface of the roller, oscillatory arms supporting the cylinder, rock-arms pivotally carried by said cylinder-supporting arms and held with their free ends pressed yieldingly therefrom, levers pivotally carried by said rock-arms, means holding said levers inoperative with respect to the cylinder-supporting arms, means rotatable with the said roller for imparting endwise movement to said levers toward the cylinder-supporting arms, means to trip the means holding said levers in said inoperative position, means to throw said levers to operative position after said holding means is tripped, means to swing said rock-arms toward the cylinder supporting arms to cause said levers to swing the cylinder-supporting arms and withdraw the cylinder from the plane of movement of the printing surface of said roller without throwing said roller and cylinder out of gear, means for restoring said levers to inoperative relation with respect to the cylinder-supporting arms, and means to maintain the cylinder in inoperative relation with respect to the printing surface of said roller for a part of its revolution after said lever has been restored to its inoperative relation with respect to the cylinder-supporting arms.

9. In a cylinder printing press, the combination of a printing roller, a cylinder geared to said roller, yielding means holding the cylinder in the plane of movement of the printing surface of the roller, oscillatory arms supporting the cylinder, rock-arms pivotally carried by said cylinder-supporting arms and held with their free ends pressed yieldingly therefrom, levers pivotally carried by said rock-arms, means holding said levers inoperative with respect to the cylinder-supporting arms, means rotatable with the said roller for imparting endwise movement to said levers toward the cylinder-supporting arms, means to trip the means holding said levers in said inoperative position, means to throw said levers to operative position after said holding means is tripped, means to swing said rock-arms toward the cylinder-supporting arms to cause said levers to swing the cylinder-supporting arms and withdraw the cylinder from the plane of movement of the printing surface of said roller without throwing said roller and cylinder out of gear, means for restoring said levers to inoperative relation with respect to the cylinder-supporting arms, and means rotatable with said cylinder to maintain the same in inoperative relation with respect to the printing surface of said roller, for a part of its revolution after said lever has been restored to its inoperative relation with respect to the cylinder-supporting arms.

10. In a cylinder printing press, the combination of a printing roller, a cylinder geared to said roller, yielding means holding the cylinder in the plane of movement of the printing surface of the roller, oscillatory arms supporting the cylinder, rock-arms pivotally carried by said cylinder-supporting arms and held with their free ends pressed yieldingly therefrom, levers pivotally carried by said rock-arms, means holding said levers inoperative with respect to the cylinder-supporting arms, means rotatable with the said roller for imparting endwise movement to said levers toward the cylinder-supporting arms, means to throw said levers to operative position after said holding means is tripped, means to swing said rock-arms toward the cylinder-supporting arms to cause said levers after being tripped to swing the cylinder-supporting arms and withdraw the cylinder from the plane of movement of the printing surface of said roller without throwing said roller and cylinder out of gear, means for restoring said levers to inoperative relation with respect to the cylinder supporting arms, a circular flange rotatable with and concentric of the cylinder and provided with an opening, a hook-arm rigid with said holding means, and means for holding said hook-arm pressed against the inner side of said circular flange and for drawing said hook-arm outwardly through said opening as the rotation of the cylinder disposes said opening opposite said hook-arm and for simultaneously tripping said holding means from engagement with said lever to permit the latter to return to operative relation with respect to the cylinder-supporting arms.

11. In a cylinder printing press, the combination of a printing roller, a cylinder geared to said roller, yielding means holding the cylinder in the plane of movement of the printing surface of the roller, oscillatory arms supporting the cylinder, rock-arms pivotally carried by said cylinder-supporting arms and held with their free ends pressed yieldingly therefrom, levers pivotally carried by said rock-arms, means holding said levers inoperative with respect to the cylinder-supporting arms, means rotatable with the said roller for imparting endwise movement to said levers toward the cylinder-supporting arms, means to throw said levers to operative position after said holding means is tripped, means to swing said rock-arms toward the cylinder-supporting arms to cause said levers after being tripped, to swing the cylinder-supporting arms and withdraw the cylinder from the plane of movement of the printing surface of said roller without throwing said roller and cylinder out of gear, means for restoring said levers to inoperative relation with respect to the cylinder supporting arms, a circular flange rotatable with and concentric of the cylinder and provided with a pair of openings, a hook-arm rigid with said holding means, means for holding said hook-arm pressed against the inner side of said circular flange and for drawing said hook-arm outwardly through one of said openings as the rotation of the cylinder disposes said opening opposite said hook-arm and for simultaneously tripping said holding means from engagement with said lever to permit the latter to return to operative relation with respect to the cylinder-supporting arms, means to limit the outward movement of said hook-arm, and a lip projecting from the rear wall of the other opening of said flange and forward with respect to the direction of rotation of the cylinder, to engage said hook-arm and return it through said second opening to the inner side of said flange.

12. In a cylinder printing press, a driven printing roller and an impression cylinder suitably driven, cam-actuated means for moving the cylinder from the path of the printing surface of the roller without interrupting the rotation of the cylinder or roller, means for periodically disposing the cylinder-moving means in inoperative relation to the same, means for holding said cylinder-moving means in such inoperative position, yielding means tending to trip said holding means from the path of the cylinder-moving means, means for causing said holding means to hold the cylinder-moving means in inoperative relation to the cylinder at times, and means coaxial and rotatable with the cylinder for maintaining said holding means in its holding position for a predetermined time.

13. In a printing press, a suitable frame, a plate carried thereby, a rotatable cylinder suitably journaled beyond the front end of said plate and provided with a longitudinal groove in its periphery, a set of clamping jaws carried by the cylinder, a rock-shaft above said plate and provided with a crank arm, yielding means to rock said shaft forward an arm journaled on said shaft and projecting beyond the front end of the said plate, yielding means rotatable with said shaft and of greater power than the first-named yielding means and tending to hold said last-named arm yieldingly depressed into the path of an envelop or sheet of paper fed forwardly off said plate, and means for closing said jaws as the rotation of the cylinder carries them forwardly past the front end of said plate and for causing one of the jaws in such closing movement to raise the said yieldingly-depressed arm.

14. In a printing press, a suitable frame, a plate carried thereby, a rotatable cylinder suitably journaled beyond the front end of said plate and provided with a longitudinal groove in its periphery, a set of clamping jaws carried by the cylinder, a rock-shaft above said plate and provided with a crank-arm, yielding means to rock said shaft forward, an arm journaled on said shaft and projecting beyond the front end of the said plate, yielding means rotatable with said shaft and of greater power than the first-named yielding means and tending to hold said last-named arm yieldingly depressed into the path of an envelop or sheet of paper fed forwardly off said plate, means for closing said jaws as the rotation of the cylinder carries them forwardly past the front end of said plate and for causing one of the jaws in such closing movement to raise the said yieldingly depressed arm, and means for securing said arm in its elevated position.

15. In a printing press, a rotating printing roller, a rotating impression cylinder movable toward and from said roller, a plate, a gripper-mechanism rotatable with the cylinder, a yieldingly-depressed arm in the path of an envelop or sheet on said plate, means to cause the gripper mechanism to successively raise said arm and grip said envelop or sheet and draw it around with the cylinder, means tending to effect movement of the cylinder from the printing roller, and means caused by the envelop or sheet extending from the plate to the gripper mechanism, to prevent the action of the means for effecting movement of the cylinder from the roller.

16. In a printing press, a rotating printing roller, a rotating impression cylinder movable toward and from said roller, a plate, a gripper-mechanism rotatable with the cylinder, a yieldingly-depressed arm in the path of an envelop or sheet on said plate, means to cause the gripper-mechanism to successively raise said arm and grip said envelop or sheet and draw it around with the cylinder, means tending to effect movement of the cylinder from the printing roller, and means rotatable with the cylinder, for preventing the action of the means for effecting such movement of the cylinder for a part of a revolution of the same, after the means actuated by the envelop or sheet has ceased to be operative.

17. In a printing press, a rotating printing roller, a rotating impression cylinder movable toward and from said roller, a plate, a gripper-mechanism rotatable with the cylinder, a yieldingly-depressed arm in the path of an envelop or sheet on said plate, means to cause the gripper-mechanism to successively raise said arm and grip said envelop or sheet and draw it around with the cylinder, means tending to effect movement of the cylinder, from the printing roller, means rotatable with the cylinder, for preventing the action of the means for effecting such movement of the cylinder for a part of a revolution of the same, after the means actuated by the envelop or sheet has ceased to be operative, and means to restore the cylinder-moving means to inoperative position after it has caused the cylinder to move away from the roller.

18. In a printing press, a rotating printing roller, a rotating impression cylinder movable toward and from the said roller, a plate, gripping-mechanism rotatable with the cylinder and adapted to pick up an envelop or sheet in the event that such envelop or sheet is properly positioned on said plate, a rock-shaft above said plate, provided at one end with an upwardly projecting crank-arm having an upwardly projecting stop and a notch at the front side of said stop, a spring tending to hold said rock-shaft with its crank arm at its forward limit of movement, an arm projecting from the rock-shaft and held normally depressed by the latter below the front end of said plate and in the path of the gripper-mechanism, a vertically-movable hook forward of said stop and above the notch of the crank-arm when the latter occupies its advanced position, means rotatable with the cylinder for normally holding said hook above said notch and adapted at a certain period in its revolution to permit said plate to be moved downward, means holding the cylinder pressed yieldingly toward the roller, reciprocating means for moving the cylinder away from the roller, means normally holding the reciprocating means inoperative with respect to the cylinder, means for tripping said holding means and drawing said hook down into said notch, and means when the holding means is tripped, for positioning the reciprocating means to move the cylinder away from the roller.

19. In a printing press, a rotating printing roller, a rotating impression cylinder movable toward and from the said roller, a plate, gripping-mechanism rotatable with the cylinder and adapted to pick up an envelop or sheet in the event that such envelop or sheet is properly positioned on said plate, a rock-shaft above said plate provided at one end with an upwardly projecting crank-arm having an upwardly projecting stop and a notch at the front side of said stop, a spring tending to hold said rock-shaft with its crank-arm at its forward limit of movement, an arm projecting from the rock-shaft and held normally depressed by the latter below the front end of said plate and in the path of the gripper-mechanism, a vertically-movable hook forward of said stop and above the notch of the crank-arm when the latter occupies its advanced position, means rotatable with the cylinder for normally holding said hook above said notch and adapted at a certain period in its revolution to permit said plate to be moved downward, means holding the cylinder pressed yieldingly toward the roller, reciprocating means for moving the cylinder away from the roller, means normally holding the reciprocating means inoperative with respect to the cylinder, means for tripping said holding means and drawing said hook down into said notch, means when the holding means is tripped, for positioning the reciprocating means to move the cylinder away from the roller, and yielding means for holding the arm depressed which projects beyond and below said plate.

20. In a printing press, a rotating printing roller, a rotating impression cylinder movable toward and from the said roller, a plate, gripping-mechanism rotatable with the cylinder and adapted to pick up an envelop or sheet in the event that such envelop or sheet is properly positioned on said plate, a rock-shaft above said plate provided at one end with an upwardly-projecting crank-arm having an upwardly-projecting stop and a notch at the front side of said stop, a spring tending to hold said rock-shaft with its crank-arm at its forward limit of movement, an arm projecting from the rock-shaft and held normally depressed by the latter below the front end of said plate and in the path of the gripper-mechanism, a vertically movable hook forward of said stop and above the notch of the crank-arm when the latter occupies its advanced position, means rotatable with the cylinder for normally holding said hook above said notch and adapted at a certain period in its revolution to permit said plate to be moved downward, means holding the cylinder pressed yieldingly toward the roller, reciprocating means for moving the cylinder away from the roller, means normally holding the reciprocating means inoperative with respect to the cylinder, means for tripping said holding means and drawing said hook down into said notch, means when the holding means is tripped, for positioning the reciprocating means to move the cylinder away from the roller, yielding means for holding the arm depressed which projects beyond and below said plate, and means projecting from the means movable with the cylinder, for reëlevating the said hook out of the notch of said crank-arm once in each revolution of the cylinder.

21. In a printing press, a rotating printing roller, a rotating impression cylinder movable toward and from the said roller, a plate, gripping-mechanism rotatable with the cylinder and adapted to pick up an envelop or sheet in the event that such envelop or sheet is properly positioned on said plate, a rock-shaft above said plate provided at one end with an upwardly-projecting crank-arm having an upwardly-projecting stop and a notch at the front side of said stop, a spring tending to hold said rock-shaft with its crank-arm at its forward limit of movement, an arm projecting from the rock-shaft and held normally depressed by the latter below the front end of said plate and in the path of the gripper-mechanism, a vertically-movable hook forward of said stop and above the notch of the crank-arm when the latter occupies its advanced position, means rotatable with the cylinder for normally holding said hook above said notch and adapted at a certain period in its revolution to permit said plate to be moved downward, means holding the cylinder pressed yieldingly toward the roller, reciprocating means for moving the cylinder away from the roller, means normally holding the reciprocating means inoperative with respect to the cylinder, means for tripping said holding means and drawing said hook down into said notch, means when the holding means is tripped, for positioning the reciprocating means to move the cylinder away from the roller, yielding means for holding the arm depressed which projects beyond and below said plate, means projecting from the means movable with the cylinder, for reëlevating the said hook out of the notch of said crank-arm once in each revolution of the cylinder and for restoring said holding means to operative position, and means for returning the reciprocating means to inoperative position previous to the restoration of said holding means to operative position to permit the latter to maintain said reciprocating means in inoperative position.

22. In a printing press, a printing couple, one member of said couple having a plurality of impression surfaces, and mechanism whereby the impression is thrown off automatically if a sheet is not properly fed to any impression surface of said member only during the time when such sheet should have been printed and without affecting the operation of another impression surface.

23. In a printing press, a printing surface carrier and an impression cylinder co-acting therewith having a plurality of impression surfaces; and means for automatically throwing off impression if a sheet is not properly fed to any impression surface of said cylinder only during the time that such sheet should have been printed and without affecting the printing of sheets on the other impression surface.

24. In combination, a plate cylinder, an impression cylinder co-acting therewith having a plurality of impression surfaces; and means for automatically throwing the impression cylinder off impression if a sheet is not properly fed to any impression surface thereof only during the time that such sheet should have been printed.

25. In a printing press, the combination of a plurality of printing surfaces; an impression cylinder having a plurality of impression surfaces; and means for automatically throwing off impression without stopping the press to prevent the printing operation of any impression surface to which a sheet is not fed, without interrupting the printing operation of another impression surface to which sheets are fed.

26. In a printing press, a printing couple, one member of said couple having a plurality of impression surfaces; and mechanism whereby the impression is thrown off automatically if a sheet is not properly fed to an impression surface of said member during that part of the rotary movement of said member wherein such sheet should have been printed, and is automatically thrown on to permit the operation of another impression surface, substantially as described.

27. In a printing press, the combination of a printing couple, one member of said couple having a pair of impression surfaces and mechanism for automatically throwing and holding said impression member off impression if a sheet is not properly fed to any impression surface thereof during that portion of the rotation of said member wherein such sheet should have been printed, and for throwing said member on impression during the remainder of its rotation to enable another impression surface to print properly fed sheets.

28. The combination, a plate cylinder; an impression cylinder co-acting therewith having a plurality of impression surfaces; and means for automatically throwing the cylinder off impression if a sheet is not properly fed to any impression surface thereof during that portion of its rotation wherein such sheet should have been printed and for throwing said cylinder on impression for the remainder of its rotation to print sheets fed to another impression surface.

29. In a printing press, an impression cylinder having two impression surfaces, and means for automatically throwing said cylinder off impression for part of its revolution in order to prevent the printing operation of any impression surface to which a sheet is not fed and for throwing said cylinder on impression for the remainder of its revolution to permit the printing operation of that impression surface to which sheets are properly fed.

30. In a printing press, an impression cylinder having two impression surfaces, means for feeding sheets thereto, an independent detector device for each impression surface, and means controlled by said detector means for automatically throwing said cylinder off impression for such part or parts of its revolution as will prevent the printing operation of either impression surface if it fails to receive a sheet, and for throwing said cylinder on impression for such part or parts of its revolution as will permit the cylinder to print a sheet taken by its other impression surface, whereby the failure of one impression surface to print does not affect the operation of the other impression surface.

31. In a printing press, the combination of an impression cylinder having two impression surfaces; means for feeding sheets thereto; and automatic mechanism whereby if a sheet is not properly fed to either impression surface of the cylinder the impression is thrown off during that part of the revolution of such cylinder in which such sheet should have been printed; and is automatically thrown on for the remainder of its revolution so that a sheet properly fed to the other impression surface of the cylinder will be printed; the throw-off mechanism being independently controlled by devices related to the respective surfaces of the impression cylinder whereby the failure of one impression surface to print does not affect the operation of the other impression surface.

In testimony whereof I affix my signature in the presence of two witnesses.

JOHN H. BARR.

Witnesses:

HELEN C. RODGERS,

G. Y. THORPE.